UNITED STATES PATENT OFFICE.

DOMINGO LOPEZ, OF ST. ALBANS, WEST VIRGINIA.

PRODUCTION OF CALCIUM ARSENATES.

No Drawing.  Application filed March 19, 1923. Serial No. 626,159.

*To all whom it may concern:*

Be it known that DOMINGO LOPEZ, a citizen of the Republic of Mexico, residing at St. Albans, in the county of Kanawha and State of West Virginia, has invented certain new and useful Improvements in Production of Calcium Arsenates, of which the following is a specification.

My invention relates to the production of arsenates, more particularly calcium arsenate.

It has been proposed to manufacture arsenates by oxidizing in the presence of water, an arsenic derivative for example arsenious acid, to arsenic acid by means of a halogen by providing a compound adapted to form a haloid with the halogen reagent and thereafter adding a suitable metal compound to produce the arsenate desired. I have found it is not necessary to first oxidize to arsenic acid and that the metal arsenate, preferably calcium arsenate, may be produced directly instead of indirectly, that is, in a single step instead of a series of steps. This is, of course, a considerable advantage from a manufacturing point of view, allowing economical and efficient manufacture. Moreover, the reaction is an exothermic one and it has been found that the heat evolved prevents to a certain extent the formation of soluble arsenates, which is a distinct advantage, as compounds of this type are highly undesirable in the finished product.

In the preferred form, my invention contemplates the use of an exciter which favorably affects the reaction and in addition, gives a product physically desirable it being fine and fluffy. My invention also contemplates the recovery of the calcium chloride produced and its use for refrigeration, as a drying agent for products other than food products, and for the manufacture of certain kinds of chalk.

In the preparation of arsenates, I proceed as follows, the preparation of calcium arsenate being set forth: To a mixture of calcium hydroxide, arsenious oxide and lukewarm water, at a temperature of approximately 50° C., chlorine is added resulting in the formation of calcium arsenate, instantaneously, in a single step according to the following equation:

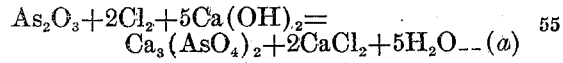

The intermediate reactions that might occur are immaterial to the process. Such reactions may be written as follows:

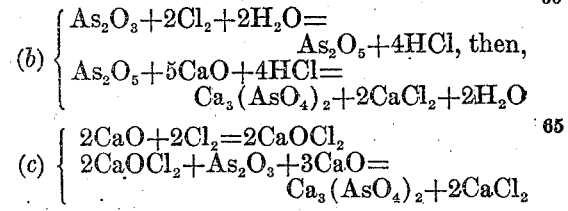

But as neither of the two can take the primacy and as neither excludes the other, it follows that neither can be looked upon as the only representative of the phenomena. If the chlorine acts upon the arsenious oxide first, then reactions (b) take place, but if the chlorine acts upon the lime first, reactions (c) occur; moreover, as the chemicals are intimately mixed, the chlorine acts upon them indiscriminately and in consequence the reaction truly representing my invention is the one marked (a).

The reaction occurs in a rather dilute solution, in which the reacting substances are preferably present in the following proportions: 198 parts of arsenious oxide, 370 parts of calcium hydroxide, 4850 parts of water, 147 parts of chlorine.

During the feeding of the chlorine the mix is kept in constant agitation by any suitable means. After the reaction is complete the product is heated to a boiling temperature to eliminate the traces of soluble arsenates.

In the preferred form, the reacting mixture has present a small amount of a base, such as sodium hydroxide, which activates or excites the reaction, confers desirable physical properties upon the calcium arsenate. To compensate for the presence of the exciter the amount of lime is reduced, the reacting compound being present in approximately the following proportions which, of course, may be varied somewhat:

198 parts of arsenious oxide, 365 parts of calcium hydroxide, 4850 parts of water, 5.5 parts of base, preferably NaOH, 147 parts of chlorine.

After the reaction is finished, the 5 parts of calcium hydroxide omitted, have to be added to the chlorinated mixture in the form of milk of lime.

The base used in the preferred form has the function of an exciter and has also a direct action upon the physical quality of the product. The explanation of this latter part in its most satisfactory form, seems to be the following:

During the main reaction (see eq. a) calcium chloride is formed which immediately reacts with the base present according to the equation;

$$CaCl_2 + 2NaOH = Ca(OH)_2 + 2NaCl$$

The calcium hydroxide obtained by the above reaction causes the formation of a very light and fluffy calcium arsenate.

This vital part of my invention has been verified by preparing calcium arsenate without any exciter, and repeating the operation on a new portion in which, before chlorinating a small amount of a base (NaOH), has been added, or a small part of the lime had been converted into calcium chloride and finally precipitated as calcium hydroxide by the addition of the corresponding amount of NaOH, and testing both products it was found, in a number of cases, that those in which the base was present excelled in lightness and that the presence of the base excites and essentially modifies the physical properties of the product.

When the reaction is completed the mother liquor should show less than one tenth of 1.% of free chlorine and about 4.% of calcium chloride. The product obtained after drawing off the mother solution contains about 57.% of $As_2O_5$ which is in excess of the requirements for a commercial insecticide. Accordingly, to reduce the $As_2O_5$ content to approximately 40.%, an inactive substance, preferably boiling milk of lime containing near 15.% of lime as the hydroxide is added. It is quite important that the milk and the product, diluted with water, be at a boiling temperature when added together. Proceeding according to the above, the mother liquor comprises calcium chloride together with small amounts of impurities. The calcium chloride may be recovered as such and sold or utilized for other purposes.

Instead of drawing off the mother liquor, the reaction-product which contains calcium chloride may be treated in the cold with any suitable chemical compound, preferably an alkali metal hydroxide or carbonate, for example, sodium hydroxide or carbonate, in an amount required to precipitate the necessary amount of inactive matter. In this manner the calcium chloride functions to produce the inactive matter necessary to bring the arsenate to the desired $As_2O_5$ content. The reactions that occur are as follows:

$$2CaCl_2 + 4NaOH = 2Ca(OH)_2 + 4NaCl$$
$$2CaCl_2 + 2Na_2CO_3 = 2CaCO_3 + 4NaCl$$

It is essential to remark that my invention covers the case of a lime rich in carbonates, in which case the reaction taking place is as follows:

$$As_2O_3 + 2Cl_2 + 5CaCO_3 = Ca_3(As_4)_2 + 2CaCl_2 + 5CO_2$$

The carbon dioxide produced in the reaction is driven off while boiling the product. In the specification and claims the term "lime" is to be understood as generic to lime or a lime rich in carbonates.

It is obvious that my invention may be varied somewhat as to details without departing from the spirit thereof. While my process is applicable, as indicated throughout the specification, to the preparation of arsenates in general, it is particularly suitable for the preparation of arsenates of the alkaline earths.

I claim:
1. The process of producing a light fluffy calcium arsenate in a single step comprising passing chlorine into a mixture of lukewarm water, arsenious oxide, and lime, and boiling after the chemical reaction occurs to minimize the production of soluble arsenates.

2. The process of producing a light fluffy calcium arsenate in a single step comprising passing chlorine into a mixture of lukewarm water, arsenious oxide, an exciter, and lime, and boiling after the chemical reaction occurs to minimize the production of soluble arsenates.

3. The process of producing a light fluffy calcium arsenate in a single step comprising passing chlorine into a mixture of lukewarm water, arsenious oxide, a small percentage of a base, and lime, and boiling after the chemical reaction occurs to minimize the production of soluble arsenates.

4. The process of producing a light fluffy calcium arnesate in a single step comprising passing chlorine into a mixture of lukewarm water, arsenious oxide, a small percentage of sodium hydroxide as an activator, and lime, and boiling after the chemical reaction occurs to minimize the production of soluble arsenates.

5. The process of producing a light fluffy calcium arsenate in a single step comprising passing chlorine into a mixture of lukewarm water, arsenious oxide, lime, and a small amount of a base as an exciter, boiling the mixture after the reaction occurs to minimize the production of soluble arsenates adding to the mixture an alkali metal compound in a quantity sufficient to react with the calcium chloride and produce an inactive compound adapted to reduce the $As_2O_5$ content of the product and recovering the solid component thereof.

6. The process of producing a light fluffy calcium arsenate in a single step comprising passing chlorine into a mixture of lukewarm water, arsenious oxide, lime, and a small amount of sodium hydroxide as activator, boiling the mixture after the reaction occurs to minimize the production of soluble arsenates, adding to the mixture an alkali metal compound in a quantity sufficient to react with the calcium chloride, and produce an inactive compound to reduce the $As_2O_5$ content of the product, and recovering the solid component thereof.

In testimony whereof I affix my signature.

DOMINGO LOPEZ.